United States Patent [19]

Shutt

[11] Patent Number: 4,803,883
[45] Date of Patent: Feb. 14, 1989

[54] ACCELEROMETER

[75] Inventor: Sidney G. Shutt, Brea, Calif.

[73] Assignee: Rockwell International Corporation, El Segundo, Calif.

[21] Appl. No.: 118,510

[22] Filed: Nov. 9, 1987

[51] Int. Cl.$^4$ .............................................. G01P 15/13
[52] U.S. Cl. .................................................. 73/517 B
[58] Field of Search .............. 73/516 R, 517 R, 517 B

[56] References Cited

U.S. PATENT DOCUMENTS

| | | | |
|---|---|---|---|
| 3,863,497 | 2/1975 | Van de Vaart et al. | 73/517 R |
| 3,884,085 | 5/1975 | Beckmann et al. | 73/517 R |
| 3,940,636 | 2/1976 | Perahia | 73/517 R |
| 4,346,597 | 8/1982 | Cullen | 73/517 R |
| 4,515,016 | 5/1985 | Hartemann et al. | 73/517 B |
| 4,676,104 | 6/1987 | Cullen | 73/516 R |

Primary Examiner—Stewart J. Levy
Assistant Examiner—Robert P. Bell
Attorney, Agent, or Firm—H. Fredrick Hamann; George A. Montanye; James F. Kirk

[57] ABSTRACT

An accelerometer comprising a frame having an input axis (y) and a cross axis (x) orthogonal to and co-planar with the input axis. The accelerometer has a flexible beam coupled to a proofmass. The beam is supported at a pivot location. A rotator coupled to the frame provides a restoring force having a first or second polarity to the beam. The restoring force is applied in a direction parallel to the input axis (y) to restore the proofmass to a reference position in response to an absence of acceleration along the input axis. A position signal sensor provides an error signal proportional to the displacement of the proofmass from the reference position. A servo responds to the error signal by applying a drive signal to the rotator which applies a restoring force to the flexible beam to restore the proofmass to its reference position. A boundary acoustic wave device on the flexible beam surface responds to strain in the flexible beam by providing an output signal having an output frequency responsive to the boundary acoustic velocity of a wave in the boundary acoustic wave device.

6 Claims, 6 Drawing Sheets

ACCELEROMETER

BACKGROUND OF THE INVENTION

1. Field of the Invention

This invention relates to accelerometers and more particularly to the field of electronically restored accelerometers using strain sensing devices such as acoustic wave devices for the measurement of acceleration by measurement of strain in a deflected beam supporting a proofmass.

2. Description of the Prior Art

A cantilevered proofmass accelerometer of early design that uses a surface acoustic wave (SAW) device to detect strain induced by bending in a beam is described in U.S. Pat. No. 3,863,497. The '497 patent is mentioned in U.S. Pat. No. 4,346,597 titled "Dual Range Cantilevered Mass Accelerometer", issued Aug. 31, 1982 to Donald E. Cullen, which also describes the use of SAW devices for detecting strain in a deflected beam.

The Cullen patent states that devices of this type have sensitivities of 0.001% of their full range. However, cantilevered beam accelerometers have the disadvantage of being sensitive to cross axis acceleration. Once the beam is deflected, in response to acceleration along the instrument's sensitive axis, the proofmass of the instrument is capable of deflecting the beam even further in response to acceleration along an axis transverse to the instrument's input axis. Cross-axis sensitivity is responsible for producing output signal rectification in response to the simultaneous application of sinusoidal acceleration along the input and transverse axes. The subject invention substantially eliminates instrument sensitivity to cross-axis acceleration.

SUMMARY OF THE INVENTION

It is an object of the present invention to provide an accelerometer that is substantially free of sensitivity to cross axis acceleration. This object is met by providing an accelerometer having a flexible beam having a first end coupled to the proofmass. A pivot support supports the flexible beam at a pivot axis (z) at a central support point between the first and second ends. The pivot axis passes through the intersection of the input axis (y) and the cross axis (x) and is normal to the plane of the input axis and cross axis.

A rotator is coupled to a frame and delivers a restoring force of a first or second polarity along the input axis (y) to the second end of the beam in response to a drive signal having a respective first or second polarity. The restoring force is applied to the second end of the beam in a direction that is parallel to the input axis (y). The pivot support pivotally supports the flexible beam on the pivot axis (z) at a point between the beam's first and second ends. The beam is free to rotate on the pivot axis within a predetermined range.

A position signal means provides an error signal proportional to the displacement of the proofmass from a reference position. A servo means responds to the error signal and applies a drive signal to the rotator to develop a restoring force to drive the flexible beam second end in a direction parallel to and in the direction of the input axis. The rotator displaces the second end through a displacement characterized to restore the proofmass to its reference position and thereby drive the error signal to zero.

A boundary acoustic wave device, such as a SAW, is coupled to the flexible beam surface and oriented for significant frequency sensitivity to strain in the flexible beam. A circuit means provides an output signal having a frequency responsive to the boundary acoustic velocity of a wave in the boundary acoustic wave device.

PREFERRED EMBODIMENT

Figures 1, 1A:
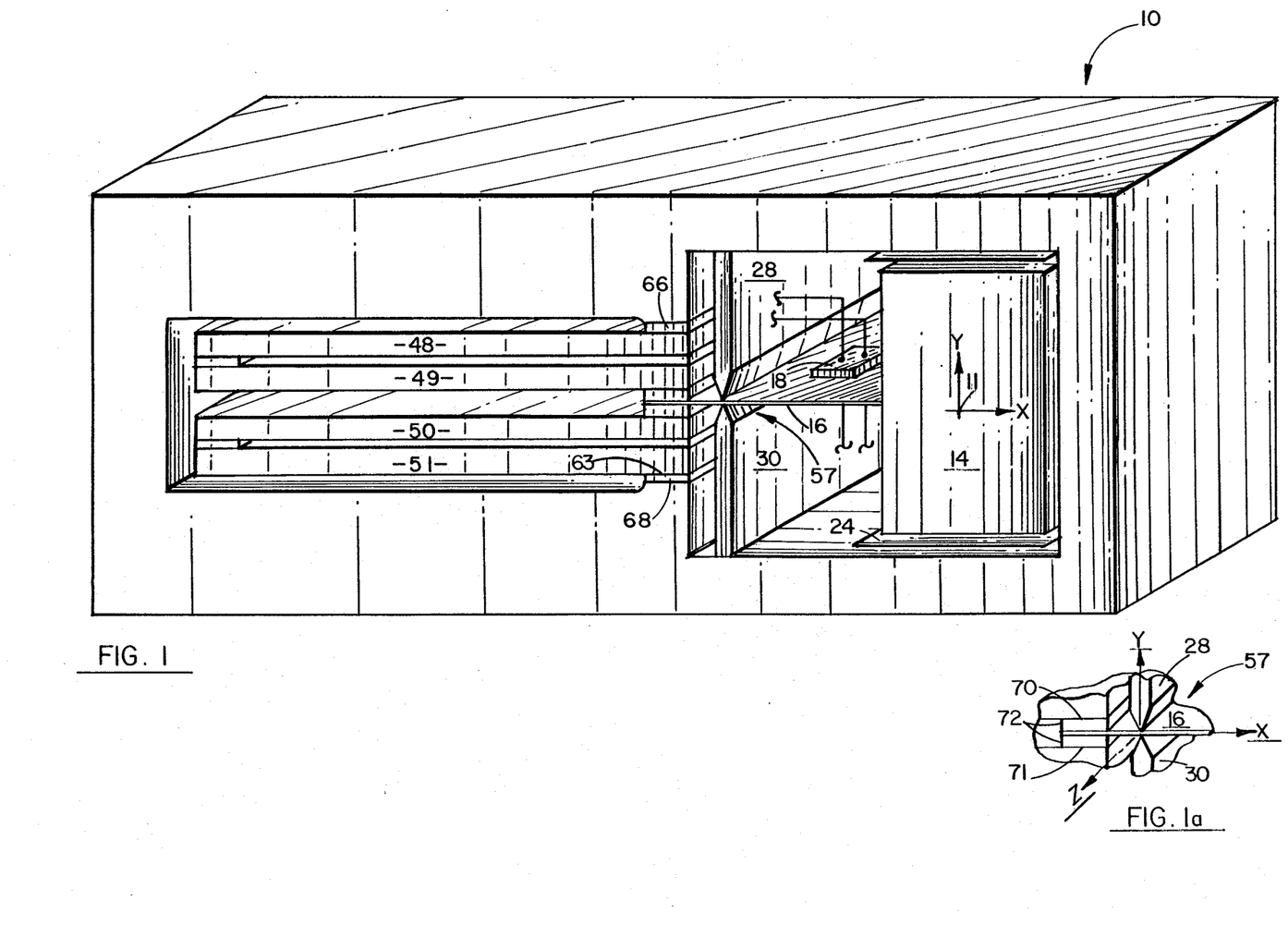
FIG. 1 is a perspective view of the invention accelerometer.
FIG. 1a is an exploded view of the beam support region of FIG. 1.
Figure 2:
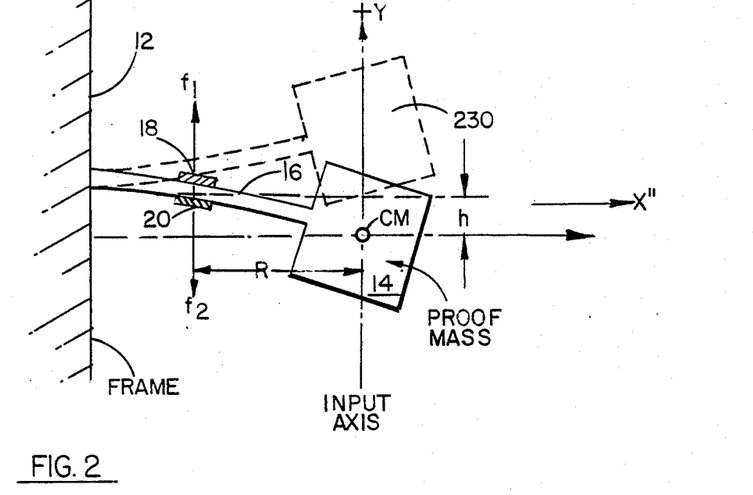
FIG. 2 is a schematic representation of a prior art cantilevered beam accelerometer operating open loop and using SAW devices.

FIG. 2 schematically shows a proofmass 14 supported by a cantilever beam 16. The cantilever mounted beam 16 extends from frame 12. Line f1, f2 passes through the top surface and bottom surface locations of 18 and 20 of blocks representing the saw surface or boundary acoustic wave devices. As shown in FIG. 2 and also in FIG. 3, the saw surface or boundary acoustic wave devices are operated in oscillator circuits adapted to be frequency dependent on the device employed. As the system of FIG. 1 is accelerated vertically in the +(y) direction, the beam deflects downward in the −(y) direction, as illustrated, through a distance h. The phantom characterization 230 shows the position that the proofmass 14 moves to in response to −(y) acceleration. An unwanted component of torque is applied to the supported mass 14 by any cross-axis acceleration that is present along the (x) axis. The magnitude of the component of error torque present is calculated by multiplying the acceleration alfong the (x) axis times the mass of proofmass 14 and times the distance h.

Figure 3:
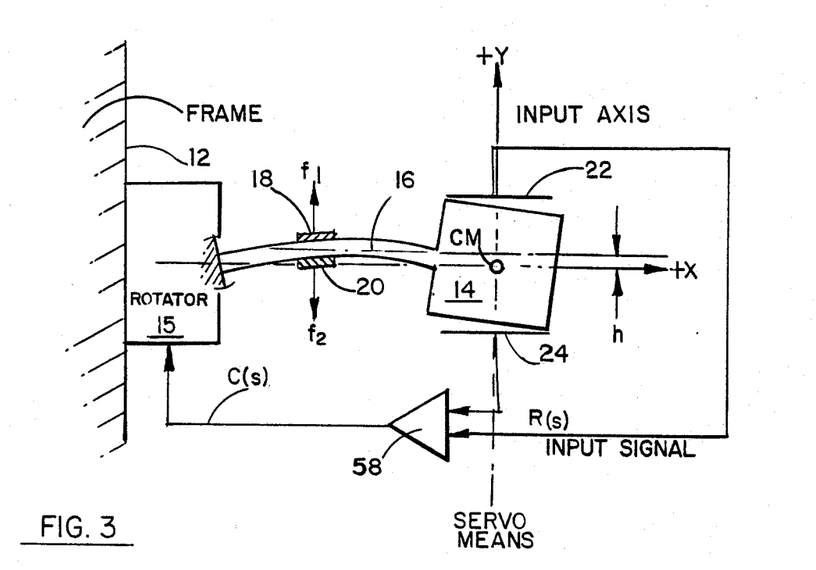
FIG. 3 is a simplified schematic representation of the invention accelerometer.

FIG. 3 shows the rotator 15 referenced to frame 12 for applying a torque to the beam 16 to maintain the beam to the proofmass to make displacement h zero in response to acceleration along the (y) axis and in accordance with the present invention. The f1, f2 line again passes through the SAW locations 18, 20. Servo means 58 receives input signal R(s) and provides drive signal C(s) to drive rotator 15 to torque beam 16 to keep the proofmass 14 between plates 22 and 24 driving input signal R(s) to substantially zero or null volts. The distance h is reduced in magnitude by operation of the rotator applying a counterclockwise torque to beam 16 within rotator 15 that raises the beam.

Figure 6:
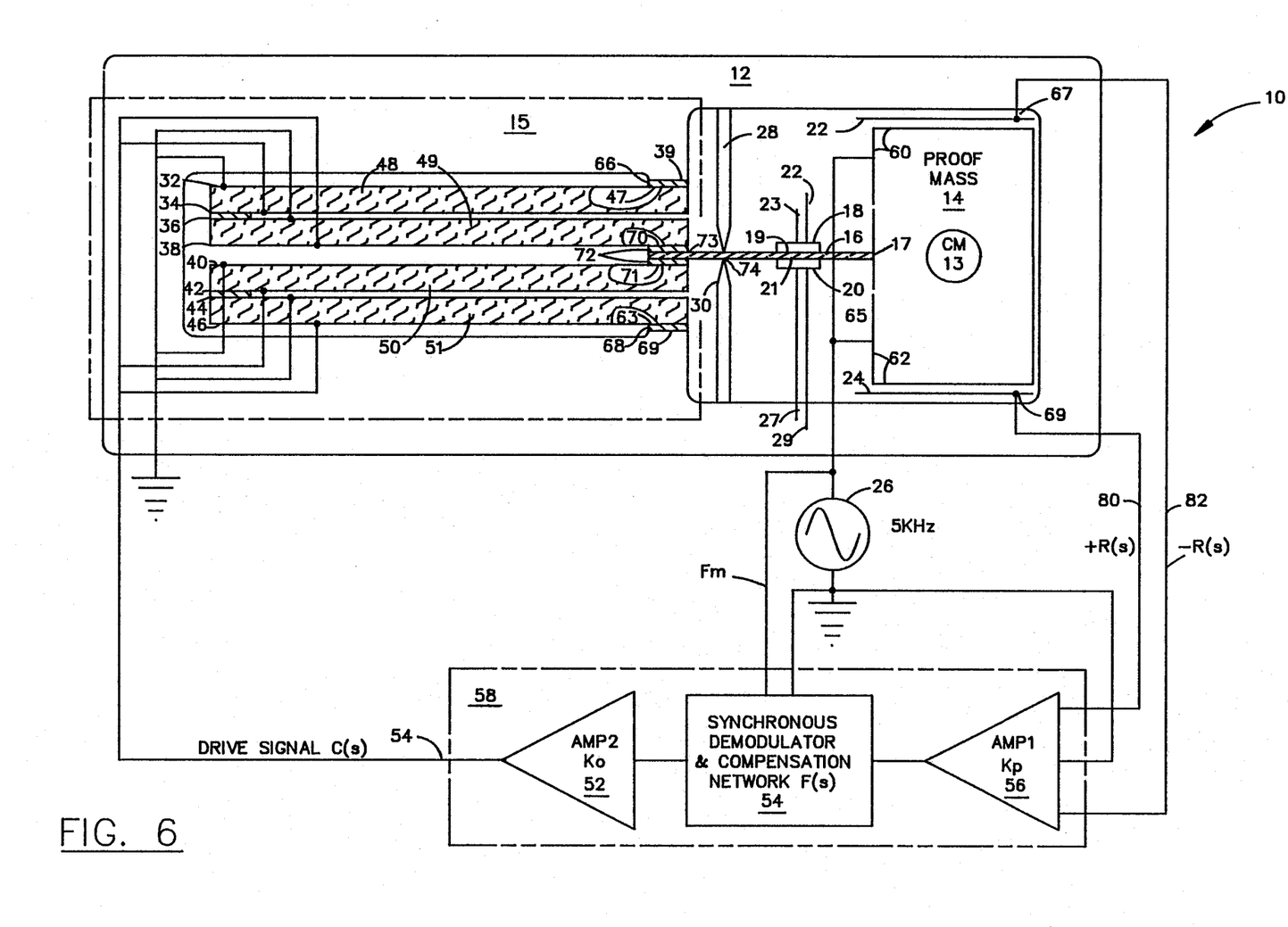
FIG. 6 is a schematic representation of the invention accelerometer showing the rotator in section and servo control elements for the rotator in block diagram form.

Blocks 18 and 20, as shown in FIG. 6, represent surface or boundary acoustic wave devices bonded to or on the flexible beam top and bottom surfaces 19, 21 respectively. The boundary acoustic wave devices 18, 20 are oriented for significant frequency sensitivity to strain in the flexible beam 16 top and bottom surfaces 19, 21 respectively. Other strain sensitive devices that could be used might include resistive strain devices and quartz crystal elements, each type of device being operated in an oscillator circuit adapted to be frequency dependent on the device employed.

Figure 4:
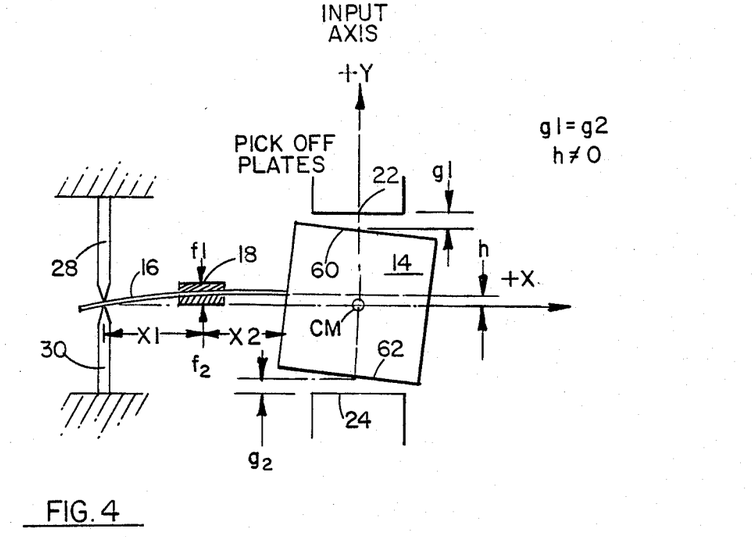
FIG. 4 is a schematic representation of a deflected and supported beam showing the proofmass in the null position for the pickoff (g1=g2) corresponding to a restored position of the center of mass of the proofmass relative to the case with $h \approx o$.

FIG. 4 illustrates by distance XI the position of the support 28, 30 in relation to the position of SAW device 18. The proof mass 14 is shown at the right end of flexible beam 16. The flexible beam is deflected to compensate for acceleration of the proofmass in the +(y) direction. The SAW device is positioned on the beam at a point of predictable strain. The SAW device is raised by the flexible beam's deflection to be at a height above a horizontal line passing through the center of the flexible beam as it passes through supports 28, 30. The proofmass upper surface 60 is shown to be at a distance g1 below the upper plate 22 and the proofmass lower surface 62 is shown to be at a distance of g2 above the lower plate 24. Distances g1 and g2 are driven to be equal by operation of the servo means 58 and rotator 15 shown in FIG. 3.

The embodiment of FIG. 3 represents a configuration in which the error torque radius h is diminished in relation to the configuration of FIG. 2, all factors, such as the flexible beam, the proofmass and the applied acceleration being equal.

Figure 5:
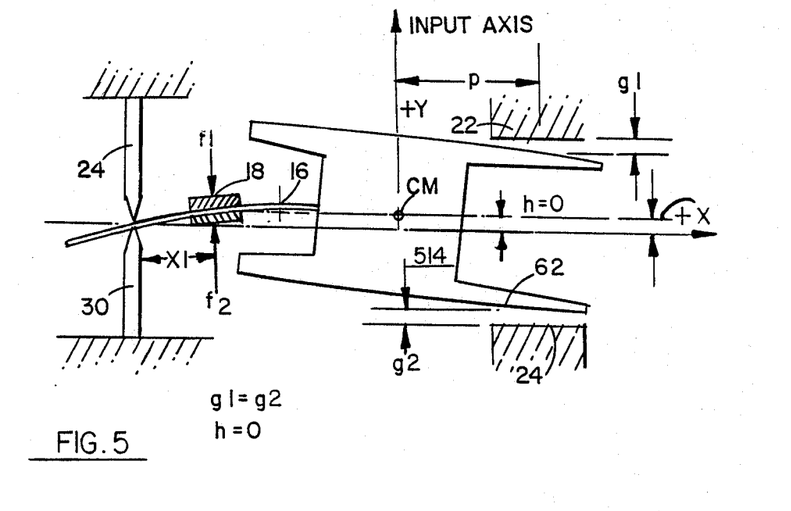
FIG. 5 is a schematic representation of a deflected and supported beam showing the null position of the pickoff (g1=g2) corresponding to the center of mass of the proofmass relative to the boundary acoustic wave devices with h=o.

FIG. 5 shows a configuration in which the center of mass CM of the proofmass 515 is displaced laterally to the left from between the plates 22, 24. The configuration of FIG. 5 permits a further reduction in the distance h as discussed in connection with FIGS. 2 and 3. The distance h is depicted as the vertical distance between a horizontal line passing through SAW device 18 and a second horizontal line passing through the center of mass and not through the gap in supports 28, 30. Distances p represents a horizontal distance measured from the center of the plates 22 and 24 to the left to a vertical line extending (y) axis through the center of mass.

The configuration of FIG. 5 provides for a further reduction in the error displacement h by permitting the center of mass CM to rise in relation to the SAW device on the surface of the flexible beam 16. Distances p and x1 are established for a particular design to minimize cross axis acceleration errors.

Referring now to FIG. 1, an accelerometer 10 in accordance with the present invention is formed within frame 12 and has an input axis (y) and a cross axis (x) orthogonal to and co-planar with the input axis. The input axis (y) and cross-axis (x) are depicted as having origin 11 on the side of proofmass 14. Referring to FIG. 6, the proofmass 14 has a center of mass 13. A flexible beam 16 has a first end 17 coupled to the proofmass, a second end 73 and a pivot axis support location 74 interposed between the first and second ends.

A pivot support 30 is coupled to the frame 12 to provide support to the flexible beam at the flexible beam support location 30. The pivot support 30 provides a relatively frictionless pivot axis (z) FIG. 1a shows the pivot axis (z) passing through the intersection of the pivot input axis (y) and the pivot cross axis (x). The pivot axis (z) is depicted as being normal to the plane of the input axis (y) and cross axis (x). FIG. 1a is added to more clearly illustrate a generalized region in FIG. 1. Reference number 57 is added to FIG. 1 to designate the generalized area.

Figures 8A, 8B, 9, 10:
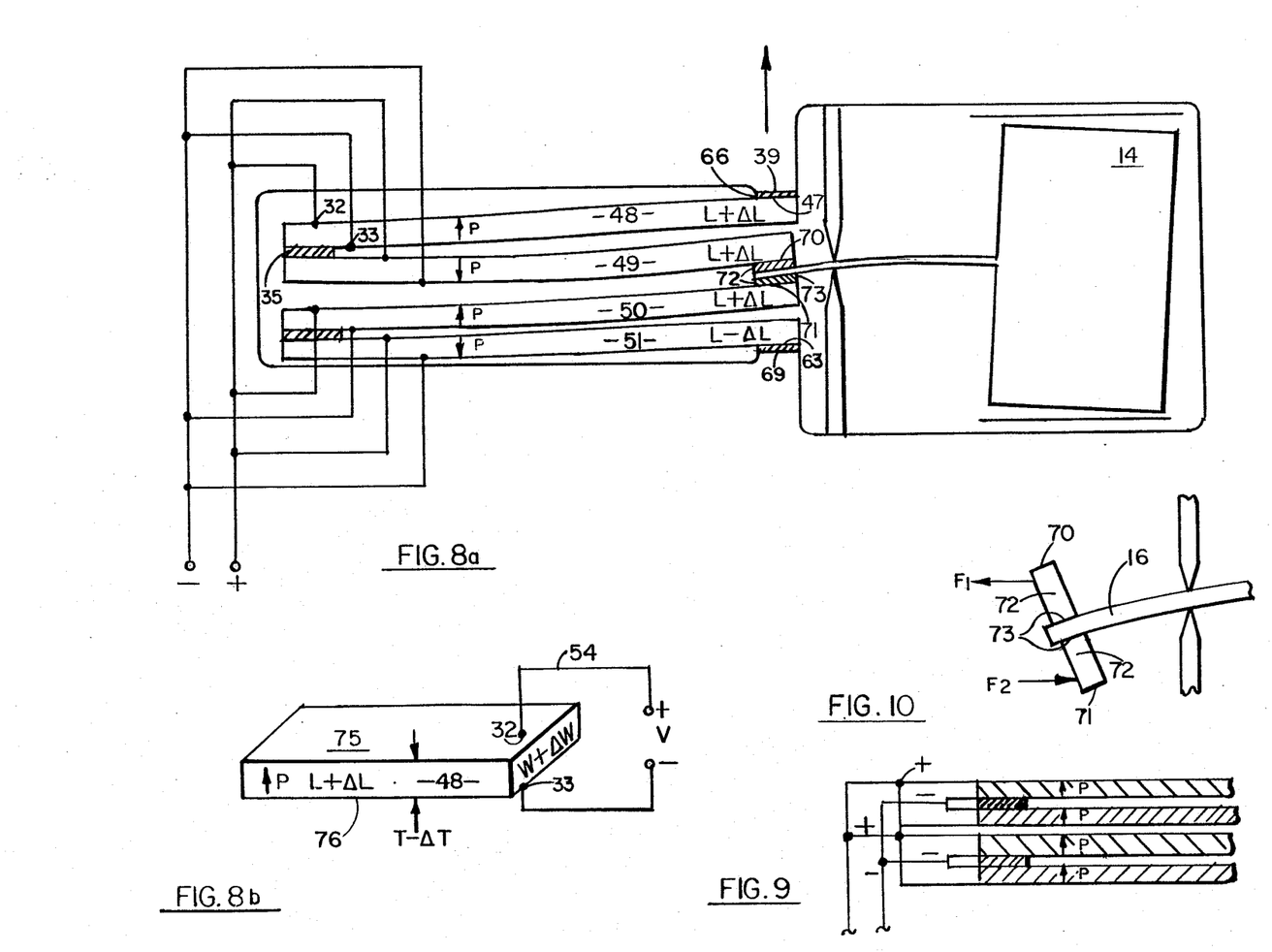
FIG. 8a is a way of connecting a polarized signal to metal contacts on a rotator formed from piezoelectric devices arranged with a first sequence of polarities.
FIG. 8b is a perspective representation of a piezoelectric device.
FIG. 9 is an alternative way of connecting a polarized signal to metal contacts on a rotator formed from piezoelectric devices arranged with a second sequence of polarities.
FIG. 10 is a schematic representation of the second end of the flexible beam showing a piezoelectric forces resulting in an applied couple.

FIG. 6 shows that phantom block 15 contains a rotator having at least a first reference surface 47, and a second reference surface 63, such as the surface region coupled via bonding layer 66 and 68 respectively. The rotator of FIG. 6 also has second reference suface 63 coupled via bonding layer 68 to a corresponding surface on frame 12. The reference surfaces of the rotator 15 shown in section in FIG. 6 are on the top and bottom of piezoelectric elements 48, 51, respectively. The rotator 15 has at least a first output surface 70, 71 for delivering a restoring force having a first or second polarity in a direction substantially parallel to the pivot input axis (y) and in a direction opposite to the direction of acceleration in response to a drive signal C(s) on signal line 54. The first output surface 70, 71 are on the bottom and top of piezoelectric elements 49 and 50, respectively. FIG. 10 schematically illustrates how movement of surfaces 70, 71 results in a torque being applied via.

The drive signal C(s) typically has a respective first or second polarity that is determined by the direction of the sensed acceleraation along the input axis (y). Acceleration in the +y direction would typically produce a drive signal of a first polarity while acceleration in the −y direction would be expected to produce a drive signal with a negative polarity.

The flexible beam second end 73 is coupled to receive the restoring force from the rotator reference surfaces 70, 71.

Pivot support 30 is coupled directly to frame 12 and pivotally supports the flexible beam on the pivot axis (z) at a support point 74 between the beam's first and second ends. The flexible beam 16 is further characterized to restore the proofmass to a reference position in response to an acceleration along the input axis (y).

Referring to FIG. 6, capacitor plate 22, top adjacent to metallized proofmass surface 60, capacitor plate 24, bottom adjacent to metallized proofmass surface 62 when excited by oscillator 26 drive signal Fm in combination represent a position signal means for providing an error signal R(s) proportional to the displacement of the proofmass from the reference position centrally located between the two capacitor plates 22, 24.

AMP 2 52, DEMODULATOR 54 and AMP1 56 in combination as depicted within phantom box 58 represent a servo means responsive to the error signal R(s) on a signal lines 80, 82 applying the drive signal C(s) on signal line 54 to the rotator 15. U.S. Pat. 3,918,050 titled "EMA Servo Digitizer" provides an embodiment of a servo means similar to that shown in block 58. U.S. Pat. 3,260,947 titled "MIDCA Amplifier" provides an embodiment of an amplifier similar to AMP1 56.

The rotator 15 develops the restoring force at rotator output surfaces 70, 71 with respect to its corresponding reference surfaces 47, 52 to drive the flexible beam second end 73 in a direction substantially parallel to the input axis, i.e. up and down. The force is applied through a displacement characterized to restore the proofmass to its reference position centrally located between plates 22 and 24. As the beam pivots on pivot axis 74, in response to the restoring force, it drives the error signal R(s) to substantially zero volts.

Blocks 18 and 20, as shown in FIG. 6, represents a surface or boundary acoustic wave device bonded to or on the flexible beam top and bottom surfaces 19, 21 respectively. The boundary acoustic wave devices 18, 20 are oriented for significant frequency sensitivity to strain in the flexible beam 16 top and bottom surfaces 19, 21 respectively. Other strain sensitive devices that could be used might include resistive strain devices and quartz crystal elements, each type of device being operated in an oscillator circuit adapted to be frequency dependent on the device employed.

Figure 7:
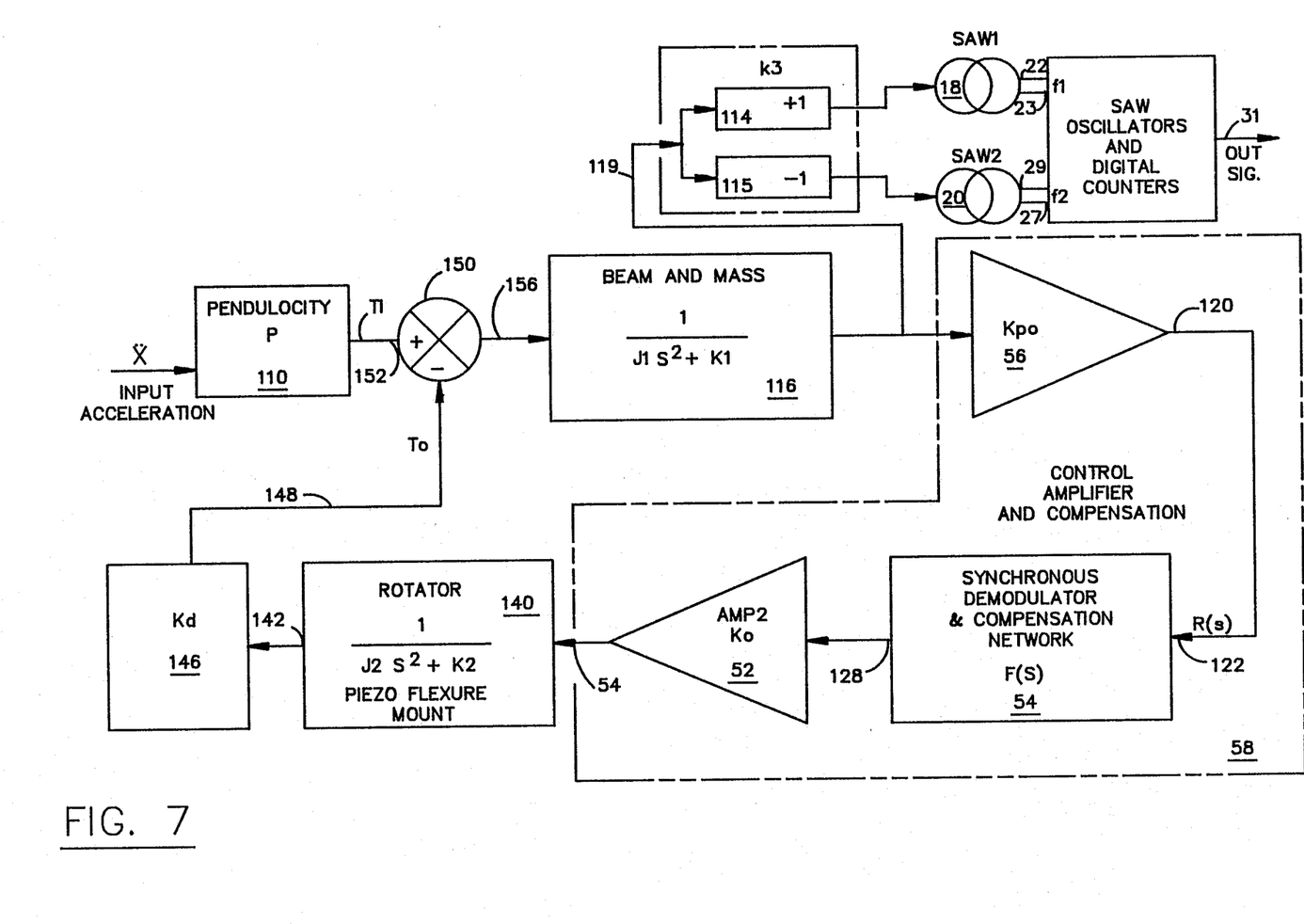
FIG. 7 is a block diagram representation of the control elements for the rotator and in block diagram form along with a block diagram characterization of the beam and the SAW elements.

Referring to FIG. 7, block 25 represents a circuit means for providing a first output signal on signal lines 22 and 23 and a second output signal on signal lines 27 and 29 to form a pair of output signals. Each of the output signals provided by the SAW devices have a frequency that is responsive to the boundary acoustic velocity of a wave in SAW1 and SAW2, the boundary acoustic wave devices 18, 20.

In a more particular embodiment, block 25 of the circuit means provides a top oscillator responsive to the top strain signal from SAW1 18 for operating at a frequency responsive to the top strain signal and a bottom oscillator responsive to the bottom strain signal from SAW2 20 for operation at a frequency responsive to the bottom strain signal.

Referring to FIG. 7, the elements within phantom block 58 comprise a servo means. Block 54 converts the input ac signal R(s) at input terminal 122 into a dc signal out of output 128. The dc output signal has a polarity that corresponds to the phase of the input signal to terminal when measured with respect to the reference signal phase from oscillator 26 as shown in FIG. 6. As the phase of the input signal at terminal 122 switches from an in-phase relationship with the reference oscillator to a 180° phase relationship in response to an input acceleration changing its polarity, the polarity of the signal out of block 126 changes to a negative polarity.

Block 54 contains a demodulator and network F(s) that feeds an amplifier 52. The network within block 54 is designed to stabilize the closed loop system with sufficient gain to provide the required frequency response and to make the errors acceptably small. The network F(s) will provide phase lead for stabilization and could provide high dc gain by introducing an integrator. The input Block 54 has an input characterized in terms of volts ac and an output in terms of volts dc.

Block 52 represents a high-voltage amplifier. The Ko term represents a fixed gain. Block 52 provides an output signal out of terminal 132 to block 140.

Block 140 in FIG. 7 represents the rotator shown as phantom block 15 within FIG. 6. The transfer function of the rotator is characterized by the piezo flexure mounts spring constant K2 and its effective moment of inertia J2.

Block 146 is a constant that relates the piezo flexure mount's output torque To, applied to beam 16, with block 140 to its input voltage on signal line 54.

Block 110 represents the input acceleration acting on the proofmass to apply a torque T1 to beam 16. The difference between T1 and To is the input torque 156 to block 116. Block 116 represents the transfer function of the beam mass structure, K1 is its spring constant and J1 is its moment of inertia. The output of block 116 is a displacement 119. Block K3 converts beam displacement 119 to top beam strain by 114 and bottom beam strain by 115 to input SAW1 and SAW2.

FIG. 8a shows the embodiment of a rotator in section formed from four piezoelectric ceramic plates 48, 49, 50 and 51 referred to as a piezoelectric rotator. Piezoelectric rotator 15 has at least a first pair of stacked piezoelectric ceramic elements 48, 49. Each pair has a top piezoelectric ceramic element such as 48 and a bottom piezoelectric ceramic element such as 49 in a parallel plane relationship and coupled to each other at a first end such as at structural adhesive layer 35. The first piezoelectric ceramic plate 48 has a first reference surface 47 at its end top reference surface mechanically coupled via structural adhesive layer 66 to frame surface 39. The bottom piezoelectric ceramic element 49 has a bottom reference surface 70 at end coupled to the flexible beam second end 73.

The beams are typically rectangular as shown in perspective view FIG. 8b. Each beam element 48 typically has a relatively high length L to thickness T ratio. Each of the piezoelectric ceramic elements have first and second parallel isolated metallized surfaces such as 75, 76. Each metallized surface has an electrical terminal 32, 33. The terminals are electrically coupled to receive said drive signal C(s) via signal line 54. Signal voltage applied to the metallized surfaces 75, 76 results in an electric field being developed within the piezoelectric device. Application of a dc electric field to the piezoelectric material between said isolated surfaces in FIG. 8b deflects said piezoelectric element by adding an incremental length to its initial length, by subtracting an incremental thickness to its initial thickness and by adding an incremental width to its initial width.

FIG. 8a depicts two pairs of piezoelectric ceramic elements. Each pair is deflected in response to an applied signal. Each of the piezoelectric ceramic elements has a known polarity. For an applied signal of a given polarity, the element deflects in a predetermined and repeatable way. Piezoelectric elements 48 and 49 are polarized and connected to produce that add. Piezoelectric element 48 moves to the left from reference surface 47 applying a force such as force F1 depicted in FIG. 10 against structural adhesive layer 72 relative to the structural adhesive layer 66 to frame reference surface 39 in response to applied signal C(s).

FIG. 10 is a schematic representation showing force F1 produced by piezoelectric elements 48, 49 and force F2 produced by piezoelectric elements 50, 51 to provide a couple at the second end of beam 16 via moment arms formed by cement lines 72 at beam second end 73. Piezoelectric elements 50, 51 are polarized to produce deflections to move surface 71 to the right, in response to the same servo output signal C(s). The same C(s) signal will cause piezoelectric elements 48, 49 to produce a deflection to move surface 70 to the left. These movements result in forces F1 and F2 being applied to the flexible beam second end 73 via bonding layers 72 to cause a rotation of the beam and movement of 73 downward. A reversal of the polarity of the applied dc signal C(s) to the signal lines in FIG. 8a is understood to result in a vertical or upward movement of the flexible beam second end 73.

Referring to FIG. 6, capacitor plate 22, top adjacent to metallized proofmass surface 60, capacitor plate 24, bottom adjacent to metallized proofmass surfaces 60, 62 are respective first and second electrical plates referenced to the frame. Each plate has a terminal 67, 69. When excited by oscillator 26 signal Fm, the plates, 60, 62 in combination with metallized surfaces 22, 24 form a position signal means for providing an error signal R(s) proportional to the displacement of the proofmass from the reference position centrally located between the two capacitor plates 22, 24.

As shown in FIG. 6, the proofmass 14 is interposed between the electrical plates and further characterized to have a common metallized surface with a terminal 65 connection to the metallized surfaces 60, 62. The first electrical plate 22 is separated by a distance from the common metallized surface to form a first capacitance having a first electrical plate first terminal such as 67 and common metallized surface terminal 60. The second electrical plate 24 is separated by a distance from the common metallized surface to form a second capacitance having a second electrical plate first terminal 69 and common metallized surface terminal 62. The first and second capacitances are connected in series at their respective common connection at the common metallized surface terminal 65.

Phantom block 58 represents an arrangement of circuit functional blocks as a circuit means for discriminating between the value of the first and second capacitance as the proofmass 14 is deflected in response to acceleration inputs along the (y) axis to provide an error signal R(s) proportional to the displacement of the proofmass from the reference position to the servo means.

AMP 2, 52, SYNCHRONOUS DEMODULATOR 54 and AMP 1, 56 in combination as depicted within phantom box 58 provide a more detailed representation of a servo means responsive to the error signal R(s) on signal lines 80, 82 applying the drive signal C(s) on signal line 54 to the rotator 15.

The rotator 15 develops the restoring force at rotator output surfaces 70, 71 with respect to its corresponding reference surfaces 47, 69 to drive the flexible beam second end 73 in a direction substantially parallel to the input axis, i.e. up or down. The force is applied through a displacement characterized to restore the proofmass to its reference position centrally located between plates 22 and 24. As the beam pivots on pivot axis 74, in response to the restoring force, it drives the error signal R(s) to substantially zero volts.

Blocks 18 and 20, as shown in FIG. 6, represents a surface or boundary acoustic wave devices bonded to or on the flexible beam top and bottom surfaces 19, 21 respectively. The boundary acoustic wave devices 18, 20 are oriented for significant frequency sensitivity to strain in the flexible beam 16 top and bottom surfaces 19, 21 respectively. Other strain sensitive devices that could be used might include resistive strain devices and quartz crystal elements, each type of device being operated in an oscillator circuit adapted to be frequency dependent on the device employed.

Although the invention method has been disclosed and illustrated in detail, it is to be clearly understood that the same is by way of illustration as an example only and is not to be taken by way of limitation. The spirit and scope of this invention is to be limited only by the terms of the appended claims.

I claim:
1. An accelerometer comprising:
   a frame having an input axis (y) and a cross axis (x) orthogonal to and co-planar with said input axis;
   a proofmass;
   a flexible beam having a first end coupled to said proofmass, a second end and a pivot axis support location interposed between said first and second ends;
   a pivot support coupled to said frame and providing support to said flexible beam at said flexible beam pivot axis support location at a point between said beam's first and second ends, said flexible beam being free to pivot on said pivot support, said pivot support forming a relatively frictionless pivot axis (z), said pivot axis passing through the intersection of said input axis (y) and said cross axis (x) and being normal to the plane of said input axis and cross axis;
   a rotator having at least a first reference surface coupled to said frame and an output surface for delivering a restoring force having a first or second polarity, said restoring force being applied in a direction parallel to said input axis (y) said flexible beam second end in response to a drive signal having a respective first or second polarity;
   said flexible beam second end being coupled to receive said restoring force, said flexible beam being further characterized to restore said proofmass to a reference position in response to an acceleration along said input axis;
   position signal means for providing an error signal proportional to the displacement of said proofmass from said reference position;
   a servo means responsive to said error signal for applying said drive signal to said rotator to develop said restoring force to drive said flexible beam second end in a direction along said input axis and with a displacement characterized to restore said proofmass to its reference position and thereby drive said error signal to substantially zero;
   a boundary acoustic wave device on said flexible beam surface and oriented for significant frequency sensitivity to strain in said flexible beam, and
   circuit means for providing an output signal having a frequency responsive to the boundary acoustic velocity of a wave in said boundary acoustic wave device.

2. The accelerometer of claim 1 wherein said rotator further comprises:
   a piezo rotator having at least a first pair of stacked piezoelectric ceramic elements, each piezoelectric ceramic beam element having a relatively high length to thickness ratio, each pair having a top piezoelectric ceramic element and a bottom piezoelectric ceramic element in a parallel plane relationship and coupled to each other at a first end, said top piezoelectric beam element having a top surface at its second end mechanically coupled to said frame, said bottom piezoelectric ceramic element having a bottom surface at its second end coupled to said flexible beam second end;
   each said piezoelectric ceramic element having first and second parallel isolated metallized surfaces, each metallized surface having an electrical terminal, said terminals being electrically coupled to receive said drive signal and to apply an electric field to the piezoelectric material between said isolated surfaces to deflect said piezoelectric elements to provide aiding forces of a first polarity to said flexible beam second end in response to a respective drive signal of a second polarity.

3. The accelerometer of claim 1 wherein said rotator further comprises:
  a piezo rotator having at least two pairs of first and second piezoelectric beam elements, each beam element having a relatively high length to thickness ration, said pair of piezoelectric elements having a first piezoelectric beam element having a first surface, first end mechanically coupled to said frame, the second surface, first end of said second piezoelectric beam element being coupled to provide said restoring force to said flexible beam second end, said restoring force being applied in a direction substantially parallel to said (y) axis, the second surface, second end of said first piezoelectric element being coupled to the second end first surface of said second piezoelectric element:
  each said piezoelectric ceramic element having first and second parallel isolated metallized surfaces, each metallized surface having an electrical terminal, said terminals being electrically coupled to receive said drive signal and to apply an electric field to the piezo electric material between said isolated surfaces to deflect said piezoelectric elements to provide aiding forces of a first polarity to aid flexible beam second end in response to a respective drive signal of a first polarity, and to provide aiding forces of a second polarity to said flexible beam second end in response to a respective drive signal of a second polarity.

4. The accelerometer of claim 1 wherein said position signal means for providing an error signal proportional to the displacement of said proofmass from said reference position further comprises:
  first and second electrical plates referenced to said frame, each plate having a terminal;
  said proofmass being interposed between said electrical plates and further characterized to have common metallized surfaces with a terminal connection to said metallized surface;
  the first electrical plate being separated by a distance from said common metallized surface to form a first capacitance having a first electrical plate first terminal and common metallized surface terminal;
  the second electrical plate being separated by a distance from said common electrical plate first terminal and common metallized surface terminal;
  said first and second capacitances being connected in series at their respective common connection at the common metallized surface terminal;
  circuit means for discriminating between the value of said first and second capacitance as said proofmass is deflected in response to acceleration inputs to provide said error signal proportional to the displacement of said proofmass from said reference position to said servo means.

5. The accelerometer of claim 1 wherein said boundary acoustic wave device on said flexible beam surface and oriented for significant frequency sensitivity to strain in said flexible beam further comprises:
  a top boundary acoustic wave device on the top of said flexible beam surface for providing a top strain signal;
  a bottom boundary acoustic wave device on the bottom of said flexible beam surface for providing a bottom strain signal; and
  wherein said circuit means further comprises:
    a top oscillator responsive to said top strain signal for operating at a frequency responsive to said top strain signal; and
    a bottom oscillator responsive to said bottom strain signal for operation at a frequency responsive to said bottom strain signal.

6. An accelerometer comprising:
  a frame having an input axis (y) and a cross axis (x) orthogonal to and co-planar with said input axis;
  a proofmass;
  a flexible beam having:
    a first end coupled to said proofmass;
    a second end; and
    a pivot axis support location interposed between said first and second ends;
  a pivot support coupled to said frame and providing support to said flexible beam at said flexible beam support location to provide a relatively frictionless pivot axis (z), said pivot axis passing through the intersection of said input axis (y) and said cross axis (x) and being normal to the plane of said input axis and cross axis;
  a rotator having at least a first reference surface coupled to said frame and an output surface for delivering a restoring force to said flexible beam second end, said restoring force having a first or second polarity, said force being applied in a direction parallel to said input axis (y) in response to a drive signal having a respective first or second polarity;
  said flexible beam second end being coupled to receive said restoring force, said pivot support being further characterized to pivotally support said flexible beam on said pivot axis (z) at a point between said beam's first and second ends, said flexible beam being further characterized to restore said proofmass to a reference position in response to an acceleration along said input axis;
  position signal means for providing an error signal proportional to the displacement of said proofmass from said reference position;
  a servo means responsive to said error signal for applying said drive signal to said rotator to develop said restoring force to drive said flexible beam second end in a direction along said input axis and with a displacement characterized to restore said proofmass to its reference position and thereby drive said error signal to substantially zero;
  sensor means for converting strain in said beam into an output signal; and
  circuit means responsive to said sensor means output signal for providing an output signal having a frequency characterized by said output signal.

* * * * *